UNITED STATES PATENT OFFICE.

NATHANIEL JENKINS, OF BOSTON, MASSACHUSETTS.

IMPROVEMENT IN THE MANUFACTURE OF ELASTIC PACKING.

Specification forming part of Letters Patent No. 54,554, dated May 8, 1866; reissue No. 3,579, dated August 3, 1869.

*To all whom it may concern:*

Be it known that I, NATHANIEL JENKINS, of Boston, in the county of Suffolk and State of Massachusetts, have invented a new and useful Elastic Packing for Joints and Valves Exposed to Destructive Fluids; and I do hereby declare that the following full, clear, and exact description of the construction and operation of the same is sufficient to enable others skilled in the art to make and use the same without other invention or discovery.

The nature of the invention consists, first, in constructing the packing of refractory earths, or earthy and stony matters, mingled with rubber and such other materials as are necessary to vulcanize the rubber, in such quantity that the earthy or stony matter shall be more than four-tenths of the entire compound, and then vulcanized in molds to the desired shape of the packing; and, second, in the selection of such earthy or stony materials and proportioning them in the compound.

An elastic packing of indestructible properties to a valve, joint, or aperture through which a destructive fluid is to pass, such as steam of any kind, hot water, kerosene or other coal-oil, hot or cold, has been unattainable till recently; but, after experiments of more than a year, I claim to have discovered a tight indestructible elastic packing for these purposes.

It will be seen from the following formulas that a leading feature of the composition is that it contains large quantities of earthy material, such as French chalk, or talcose matter, a very refractory material; Paris-white, a substance which is decomposed only at very high temperature, and in presence of air or gases of combustion, or of strong acids with steam, and is not readily fused; and litharge, which assists in vulcanizing and does not tend to decompose the other ingredients at the temperatures to which the composition is exposed.

In the selection of earthy or stony matter the choice would be governed by facility of pulverization and insusceptibility to heating influence. Soapstone is indicated as an ingredient by the use of French chalk. Paris-white indicates the use of other earthy carbonates.

The substance of the invention is the employment for a packing of an earthy powder of refractory quality, intimately mingled with vulcanized rubber, and constituting forty per cent. of the compound. With the following ingredients the proportions would be within the following limits: Pure rubber, from twenty to twenty-five per cent.; pure gum-shellac, from ten to twenty per cent.; pure Paris-white, from twenty to thirty per cent.; pure French chalk, from fifteen to twenty-five per cent.; pure litharge, from eleven to eighteen per cent.; pure lamp-black, from two to three per cent.; pure sulphur, from one to three per cent. Increase the quantity of rubber when the fluid to be resisted is less penetrating, and increase the quantity of Paris-white, French chalk, litharge, and shellac when it is more penetrating.

One hundred parts of the above substances, mingled within the percentages given, will be comparatively indestructible in the presence of coal-oil, steam, or hot water, and will preserve their elasticity and texture for a long time.

The following table of proportions now in use with coal-oil, steam, and hot-water, respectively, have given favorable results, and I am inclined to consider them the best attainable for their respective purposes.

| Articles. | Percentages for coal-oil. | Percentages for steam. | Percentages for hot water. |
|---|---|---|---|
| Rubber..... | $21\frac{1}{4}$ | $24\frac{1}{3}$ | $24\frac{1}{6}$ |
| Shellac..... | $16\frac{1}{2}$ | 11 | 15 |
| Paris-white.. | $26\frac{1}{2}$ | $21\frac{2}{3}$ | $20\frac{1}{6}$ |
| French chalk. | 16 | $24\frac{1}{3}$ | $24\frac{1}{6}$ |
| Litharge..... | $15\frac{1}{2}$ | $13\frac{1}{2}$ | $12\frac{1}{6}$ |
| Lamp-black.. | $3\frac{1}{4}$ | $2\frac{7}{12}$ | $2\frac{1}{6}$ |
| Sulphur..... | 1 | $2\frac{7}{12}$ | $2\frac{1}{6}$ |
| Parts..... | 100 | 100 | 100 |

I do not, however, confine myself to these exact proportions, but consider the composition most accurately stated by the limitations given before.

The ingredients other than the rubber are to be finely powdered and intimately mixed together; they are then to be spread on the surface of the rubber and rolled with it between cold rollers until they are thoroughly incorporated with the substance of the rubber. The mass is then to be molded in iron molds of proper shape and subjected to a high vulcanizing heat—say that due to a steam-pressure of sixty to seventy-five pounds, or, if desired to be very hard, even more—for from twenty to forty-five minutes.

I claim as my invention and desire to secure by Letters Patent—

1. An elastic packing composed of at least four-tenths of finely-pulverized refractory earthy or stony material, intimately mingled with and held together by rubber prepared for vulcanizing, and then vulcanized, as and for the purpose described.

2. The composition of the ingredients and within the proportions above set forth, substantially as and for the purpose described.

3. The employment of French chalk or equivalent talcose mineral, substantially in the manner and for the purpose described.

NATHL. JENKINS.

Witnesses:

THOS. WM. CLARKE,

GEO. R. CLARKE.

2